J. D. WOODS AND D. J. PALMER.
GIG.
APPLICATION FILED APR. 9, 1921.
1,422,805.
Patented July 11, 1922.
2 SHEETS—SHEET 1.
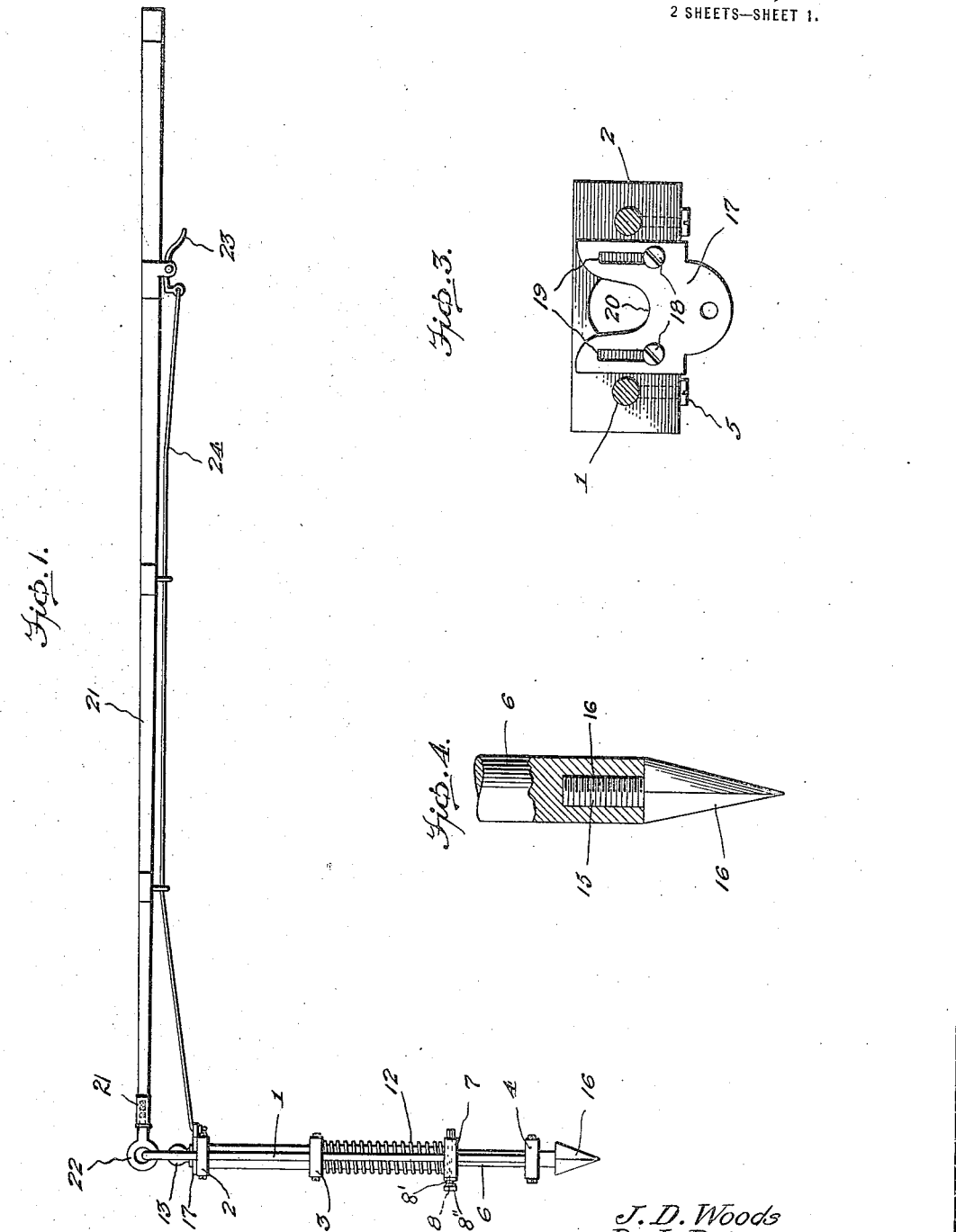
J. D. Woods
D. J. Palmer
INVENTORS

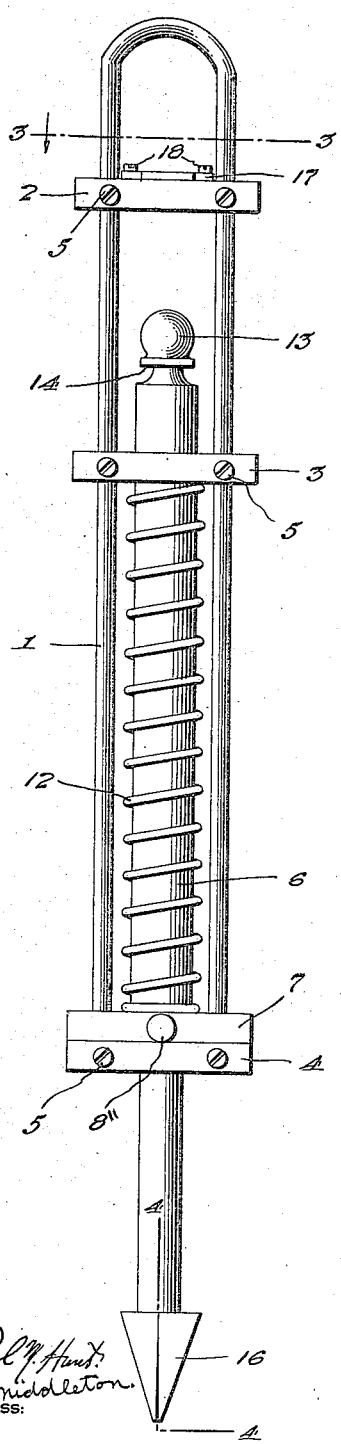
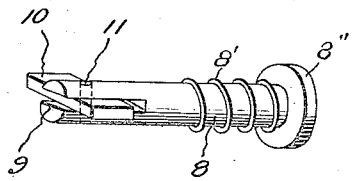
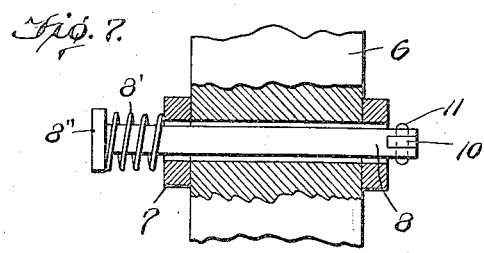
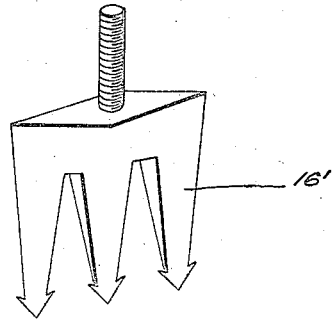

UNITED STATES PATENT OFFICE.

JOHN D. WOODS AND DENNIS J. PALMER, OF STEUBENVILLE, OHIO.

GIG.

1,422,805.   Specification of Letters Patent.   Patented July 11, 1922.

Application filed April 9, 1921. Serial No. 459,935.

*To all whom it may concern:*

Be it known that we, JOHN D. WOODS and DENNIS J. PALMER, citizens of the United States, residing at Steubenville, in the county of Jefferson and State of Ohio, have invented new and useful Improvements in Gigs, of which the following is a specification.

This invention relates to an improved fish and frog gig, the general object of the invention being to provide a simple and effective device of this nature which can be manufactured to sell at low cost and which will be easy to operate.

Another object of the invention is to provide a simple form of latching means for holding the spear in contracted position.

A further object of the invention is to provide a plurality of heads for the spear so that different types of heads may be used with the device.

Another object of the invention is to provide simple means for connecting the spring engaging block to the spear rod.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of the complete device.

Figure 2 is an enlarged view of the gig.

Figure 3 is a sectional view on line 3—3 of Figure 2.

Figure 4 is a fragmentary view, partly in section, showing the means for connecting a spear head with the spear rod.

Figure 5 is a view of one form of head which may be used with the gig.

Figure 6 is a detail view of the spring locking pin for the block.

Figure 7 is a detail sectional view showing the means for connecting block 7 to the spear rod.

As shown in these views the gig is formed of a U-shaped member 1 having the blocks 2, 3 and 4 secured thereto by means of the bolts 5. The spear rod 6 passes through the blocks 3 and 4 and a block 7 is slidably mounted on the member 1 and is detachably secured to the rod 6 by means of the pin 8 which has one end slotted, as at 9, to receive the plate 10 which is adjustably mounted in the slot by means of the pivot 11. This plate 10 acts to hold the pin in position when the plate is turned at right angles to the pin and the plate is held in this position by a spring 8' on the pin which is compressed, when the parts are in operative position, between the head 8'' of the pin and the block 7. This pin passes through a hole in the rod 6, as shown in Figure 7. In order to remove the pin it is first necessary to press upon the head of the pin to force the slotted end thereof away from block 7 to permit the plate 10 to be turned to a position where it will pass through the holes in the block and spear rod. A coil spring 12 is placed on the rod 6 and has one end bearing against the block 7 and its other end against the block 3, this spring tending to hold the spear rod in projected position. The spear rod is provided with the rounded head 13 at its upper end which forms a shoulder 14 and its lower end is provided with a screw threaded socket for receiving the screw threaded shank 15 of any one of a number of spear heads, 16 indicating a head used for spearing frogs while 16' indicates a forked spear head for use with fish.

A latch plate 17 is slidably mounted on the block 2 by means of the set screws 18 passing through slots 19 in the plate 17 and into holes in block 2. This plate 17 is provided with the recess 20 in one end which is adapted to receive the reduced part of head 13 so that the shoulder 14 will rest on the plate and thus hold the spear rod in its retracted position with the spring 12 contracted. As soon as the plate 17 is retracted to release the shoulder 14 the spring 12 will project the spear rod downwardly in the usual manner.

The handle member 21 is provided with an eye piece 22 which engages the bight of member 1 as shown in Figure 1. A finger lever 23 is pivoted on said handle 21 and a cable 24 connects said lever with the plate 17, as shown. Thus by depressing the lever 23 the cable will be caused to move the plate 17 from under shoulder 14 so as to release the spear rod.

This eye piece 22 is provided with a screw threaded stem which engages a screw threaded socket in the member 21 as shown at 21'.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. A gig of the class described comprising a U-shaped frame, cross pieces fixed thereon, a sliding latch plate on the top cross piece, a spear rod slidably mounted in the other cross pieces, spring means for projecting the spear rod, said spear rod having a part thereon for engaging the latch plate so as to hold the spear rod in retracted position.

2. A device of the class described comprising a gig, including a spring pressed spear rod, a handle member having an eye for engaging the gig, a lever on the handle member, a slidable latch plate on the gig for holding the spear rod in retracted position and a cable connecting the lever with the said latch plate.

In testimony whereof we affix our signatures.

JOHN D. WOODS.
DENNIS J. PALMER.